(12) United States Patent
Ternasky et al.

(10) Patent No.: US 7,062,402 B2
(45) Date of Patent: Jun. 13, 2006

(54) SYSTEM AND METHOD FOR AUTOMATIC TESTING OF OUTPUT DEVICE CAPABILITIES VIA ELECTRONIC DOCUMENT

(76) Inventors: Joseph D. Ternasky, 450 Sierra Vista Ave., #6, Mountain View, CA (US) 94043-2993; Robert L. C. Parker, 450 Sierra Vista Ave., #6, San Jose, CA (US) 94043-2993; Michael M. Byrd, PMB 329 14150 NE. 20, Bellevue, WA (US) 98007; Adam Eversole, 6929 142$^{nd}$ Ct. NE., Redmond, WA (US) 98052; Joseph King, 4117 Whitman Ave. N., Seattle, WA (US) 98103; Michael Stokes, 1946 E. Stonybrook Ct., Eagle, ID (US) 83616

(*) Notice: Subject to any disclaimer, the term of this patent is extended or adjusted under 35 U.S.C. 154(b) by 0 days.

(21) Appl. No.: 10/848,001

(22) Filed: May 19, 2004

(65) Prior Publication Data

US 2005/0261862 A1    Nov. 24, 2005

(51) Int. Cl.
   *G06F 19/00*    (2006.01)
(52) U.S. Cl. .......................... 702/123; 347/19; 358/406
(58) Field of Classification Search ................ 702/85, 702/102, 122, 119, 120, 123; 342/1, 2, 3, 342/19; 358/1.1, 1.9, 3.23, 3.24, 1.15, 504, 358/406; 710/104, 62, 72, 8, 4
See application file for complete search history.

(56) References Cited

U.S. PATENT DOCUMENTS

| | | | |
|---|---|---|---|
| 5,768,495 A * | 6/1998 | Campbell et al. ............. 714/25 |
| 6,628,413 B1 * | 9/2003 | Lee ........................... 358/1.15 |
| 6,710,893 B1 * | 3/2004 | Hou et al. .................. 358/1.15 |
| 6,825,941 B1 * | 11/2004 | Nguyen et al. ............. 358/1.15 |
| 6,891,632 B1 * | 5/2005 | Schwartz .................... 358/1.15 |
| 2001/0043358 A1 * | 11/2001 | Schwartz .................... 358/1.15 |
| 2002/0116421 A1 * | 8/2002 | Fox et al. .................... 707/526 |
| 2003/0020948 A1 * | 1/2003 | Jarvis et al. ................ 358/1.15 |
| 2004/0001218 A1 * | 1/2004 | Christiansen ............... 358/1.5 |
| 2004/0070640 A1 * | 4/2004 | Ferlitsch ....................... 347/19 |
| 2004/0119853 A1 * | 6/2004 | Kokubun et al. ............. 348/241 |
| 2004/0165210 A1 * | 8/2004 | Jamison et al. ............. 358/1.15 |

* cited by examiner

*Primary Examiner*—Patrick J. Assouad
(74) *Attorney, Agent, or Firm*—Shook, Hardy & Bacon L.L.P.

(57) ABSTRACT

A system and related techniques automatically exercise the output capabilities of a printer or other output device, and return a log or record of those capabilities to the print manager of a host operating system or other destination. According to embodiments, the host, client or other machine may decide to query a printer, facsimile machine, copy or multifunction machine or other device to determine its range of output capabilities such as available fonts, graphical or rending routines, firmware compatibility or other functions or capabilities. The host may transmit a composite electronic document, containing various components including intermediate language objects which may be interpreted to execute various output processing, such as exercising a set of fonts, scaling, rotating, or other rendering or output functions. The results may be captured in the printer or other output device, for instance by dumping an output buffer or returning execution codes, and returned to the host machine where the available capabilities may be displayed, including in embodiments a rendering of the physical output or simulated physical output on the user interface. The invention offers enhanced profiling and verification for printers and other output systems, compared to manual test pages and other test procedures.

23 Claims, 4 Drawing Sheets

SYSTEM AND METHOD FOR AUTOMATIC TESTING OF OUTPUT DEVICE CAPABILITIES VIA ELECTRONIC DOCUMENT

CROSS-REFERENCE TO RELATED APPLICATION

The subject matter of this application is related to the subject matter of co-pending U.S. patent application Ser. No. 10/848,001 filed Apr. 30, 2004, entitled "Document Markup Methods and Systems", which application is assigned or under obligation of assignment to the same entity as this application, and which application is incorporated by reference herein.

STATEMENT REGARDING FEDERALLY SPONSORED RESEARCH OR DEVELOPMENT

Not applicable.

FIELD OF THE INVENTION

The invention relates to the field of computing, and more particularly to a platform for the automated testing of the output capabilities of a printer or other output device using an electronic test document embedding executable routines, image samples or other data to exercise that device.

BACKGROUND OF THE INVENTION

The task of detecting and characterizing the output capabilities of printers and other output devices has been a longstanding challenge to users, application programmers, those writing device drivers and others. With no way to reliably or systematically verify printer capabilities, applications for example must make assumptions about what fonts, shading, gradient or other functions or capabilities a printer may present, by default. Part of the challenge in profiling individual printer resources is that there has been no standard way to interrogate a printer or other device with a standard protocol of tests and exercises, capture the results and return the results to the user, or to an application or the operating system. In the absence of coherent printer test protocols, resort has instead been made to different types of ad hoc printer test approaches.

One approach is to do no preprint testing—that is, not to attempt to characterize the output device, and simply send output, such as text and graphics from a word processing platform, to the printer without modification or based on a set of presumed output capabilities. This may generate successful print output when dealing with relatively simple textual or other documents, but more complex or composite data such as multipart or multiformat documents, spreadsheets, charts or other images or data make it increasingly likely that print anomalies may occur. For example a printer which is unable to scale an image, supply a drop shadowing effect or deliver certain fonts may generate garbled or half-formed characters, half tones or other output.

According to another approach, an application or printer driver may attempt to interrogate a printer or other output device to permit the device to respond with a table or other summary of the device's output capabilities. Typically however the table or store which enumerates the printer's output capabilities is a fixed listing, for instance stored in firmware, which is not capable of being exercised or verified. However the embedded tables in a printer or other device do not always accurately reflect the capabilities of that device. In other cases the device capabilities may be updated in firmware or otherwise but not reflected in that table or other resource. Therefore an internal device table may not return a valid or fully valid response which the application wishing to print or otherwise output on that device can rely upon.

An alternate approach to characterizing the output capabilities of printers has been the test-page approach, in which an application such as a word processing package or an image processing programs transmits a known, fixed test page to the printer. The user then has to take the printed output off the printer and visually examine the printed page for artifacts. While this practice may expose gaps in printer output capability, the process is not exhaustive, relies upon the user's visual review and remains basically a manual process subject to error. Other problems in verifying printer and other capabilities exist.

SUMMARY OF THE INVENTION

The invention overcoming these and other problems in the art relates in one regard to a system and method for automatically verifying the output capabilities of printers and other output devices, in which a host or other machine wishing to exercise the printer or other device may transmit an electronic test document to the device to initiate output verification. In embodiments, the electronic test document may embed a set of test components to transmit to the printer or other output device, to execute and empirically determine whether the device can deliver a set of functions or capabilities, such as halftoning functions, fonts, scaling, rotating, color matching, or other capabilities. In embodiments, the set of test components or resources may be encapsulated in an intermediate language object which in turn is embedded in or associated with the electronic document. According to embodiments that intermediate language object may be interpreted or otherwise executed in the printer or other device. The printer or other output device may be likewise programmed by the electronic test document to capture output results, such as output buffers recording pixels or lines generated by the device in response to the test routines or data, or execution codes indicating whether a given routine or function had failed or succeeded. Applications and users may therefore gain knowledge of the suite of output capabilities of a given printer or other output device in a comprehensive and systematic manner, permitting them to adjust documents, images, text and other output to match the verified output capabilities.

DETAILED DESCRIPTION OF EMBODIMENTS

Figure 1:
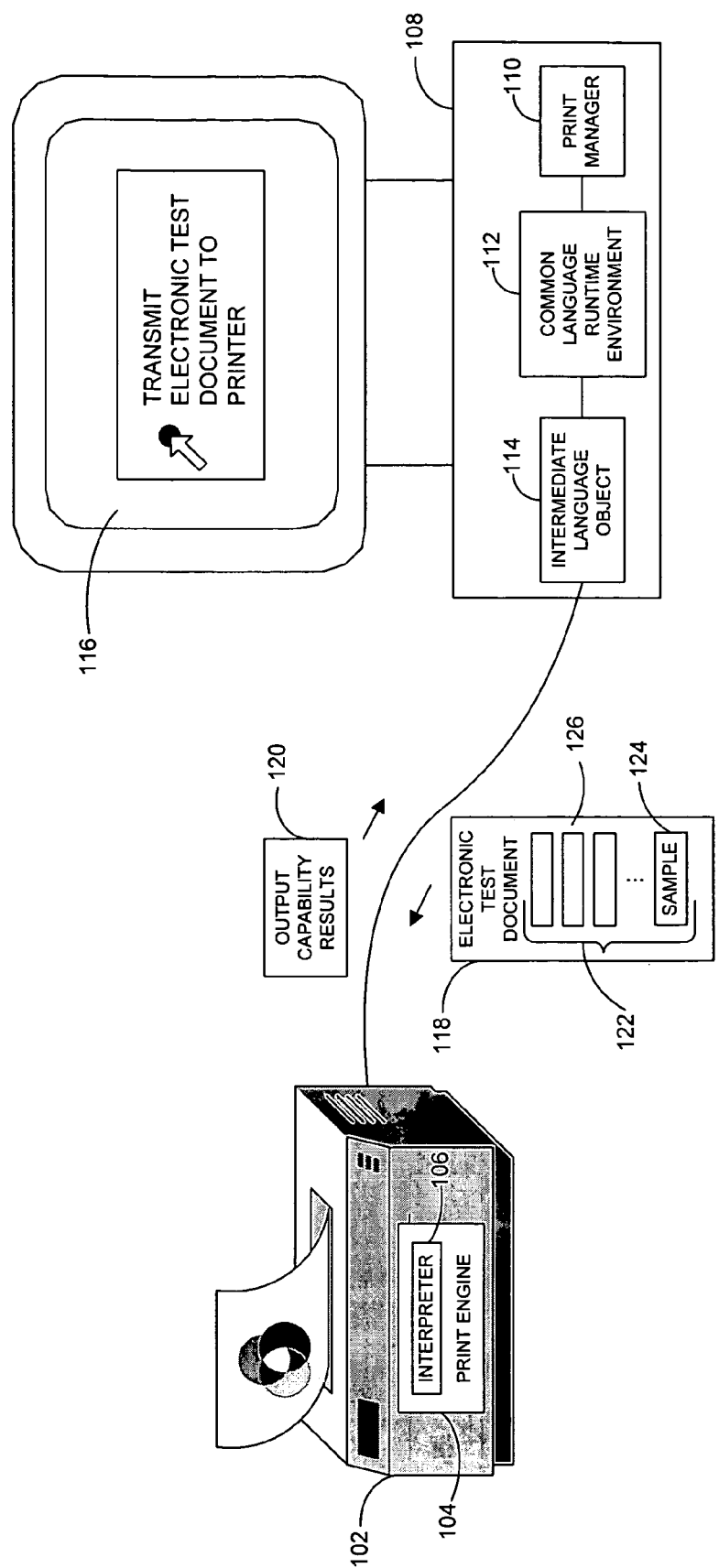
FIG. 1 illustrates an overall architecture, in which a platform for automated verification of print output capabilities according to an embodiment of the invention may operate.

FIG. 1 illustrates an architecture in which a system and method for may operate, according to an embodiment of the invention. As illustrated in that figure, in an environment in which the invention may operate a host 108 such as a computer or other client or other machine may communicate with a printer 102 or other output device. The host 108 may execute, contain or interface to resources including a printer manager 110, a common language runtime environment 112 and an intermediate language object 114, any one or more of which, or all of which may execute within or be part of an operating system or platform. Those and other resources in host 108 may cooperate to manage print, facsimile, copy or other output services.

According to embodiments of the invention in one regard, the host 108 may present a user with a user interface 116, such as a graphical user interface, by which the user may manipulate and select various printing and other output functions. As illustrated, the user may thereby initiate interrogation and testing of the printer 102 or other output device. In embodiments of the invention in one regard, the initiation of that processing and the data used to drive that processing may be encapsulated in an electronic test document 118, which may be generated via common language runtime environment 112 and associated resources. According to embodiments of the invention in one regard, the electronic test document 118 may be or include an electronic document of the type described in the aforementioned U.S. patent application Ser. No. 10/848,001 filed Apr. 30, 2004, entitled "Document Markup Methods and Systems", or other electronic document types or formats using componentized schema.

When a user initiates an output testing processing, via user interface 116 or otherwise, a set of test routines, text or image samples, or other data may be extracted or accessed, for instance from an operating system, from media such as a CD-ROM, by download via the Internet or other network, or other sources. Those test routines, samples or other data may be or include, for example, a set of print or other processing functions to be passed to printer 102 to determine whether that device can successfully complete that processing or generate that output. Illustratively the types of routines which may be used to exercise printer 102 may include, for example, routines or code to perform functions such as a gradient fill, half tone processing, drop shadowing, border draws, vector processing, glyph routines, kerning functions, color matching, ink depletion management, transparency routines, text or image scaling, color conversions, edge sharpening, resolution enhancement or other rendering or other functions. Samples which may be used to exercise output capabilities of printer 102 may include, for example, images such as color or black and white image files, fonts or sets of fonts, character sets such as ASCII or Unicode character sets, or other data which may be generated as output on physical media on printer 102 or other output device.

When a user selects output capability processing and the set of test routines and/or samples are accessed, printer manager 110 may for example pass those test components to common language runtime environment 112. The common language runtime environment 112 may receive the desired test routines, samples or other components, and compile the code, instructions, content or data reflecting those updates to an intermediate language object 114. The intermediate language object 114 may be or include, in embodiments, interpretable or executable code. According to the invention in another regard, the intermediate language object 114 generated from desired test components may then be embedded, attached, linked to, or otherwise associated with an electronic test document 118 for transmission to printer 102 or other output device. The intermediate language object 114 may be embedded or associated with the electronic test document 118 via the common language runtime environment 112, by action of the operating system, by an output-aware application such a word processing application, or other services or resources.

Figure 2:
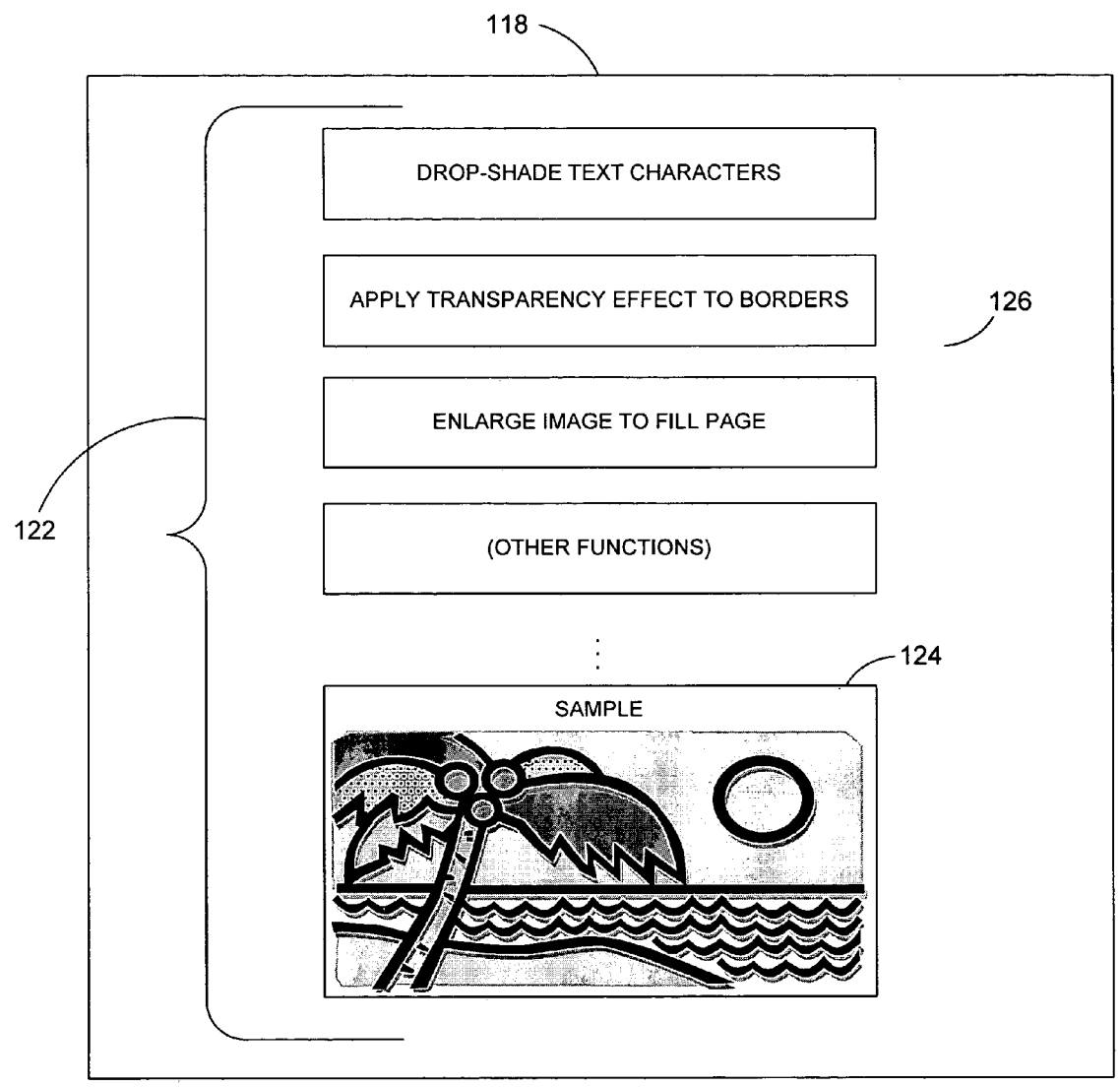
FIG. 2 illustrates a set of output verification parameters selectable by a user, according to embodiments of the invention.

The electronic test document 118 so generated may contain a set of components 122, including routines, functions, tests, samples or other data as described. In embodiments as illustrated in FIG. 2, more than one routine or function may be combined in the set of routines 126, and the set of routines 126 may in embodiments be combined with one or more sample 124 in a single electronic test document 118.

The electronic test document 118 once generated may be transmitted to the printer 102 or other output device via connection such as a parallel, serial or universal serial bus (USB) or other port or connection, and received in print engine 104 of printer 102. The print engine 104 may be configured to detect the presence of executable or interpretable code or instructions within the electronic test document 118. In the case where such code or resources are present as illustrated, the print engine 104 may invoke an interpreter 106 to read the electronic test document along with the set of components 122, such as set of routines 126 and one or more sample 124. The set of components 122 communicated in electronic test document 118 may be encoded, for example, in assembler or assembler-like code, in C++ or XML (eXtensible Markup Language) code or data, or other executable or interpretable information.

When the set of components 122 are interpreted by print engine 104 those routines, samples and other data may be processed and executed to cause the printer 102 to initiate the generation of corresponding print or other output. For example, the print engine 106 of printer 102 may respond to instructions to render a gradient-filled circle or other shape or function by generating pixels of increasing darkness or shade from a central point outwards in a circular shape. The print engine 106 may similarly generate encoded one or more sample 124, or other functions, routines, text, image, or other data, in response to electronic test document 118 and encapsulated test samples and routines. In embodiments, the printer 102 may actually print the results on paper, while in others, the pixel or other output may be generated without necessarily printing to paper or other physical media.

Once the printer 102 has generated a response to the routines, samples or data contained in electronic test document 118, the print engine 106 or other logic control may capture the resulting printer output for evaluation. According to embodiments of the invention, the output may be captured, for example, by reading an output buffer in printer 102, to determine the pixels, vectors, raster images or other output prepared to be physically generated to paper or otherwise. In further embodiments, the output may be captured by way of receiving electronic codes, for example indicating whether the output operation, for example printing a page or scaling an image, has succeeded, failed, been suspended or entered another state.

Once the output response of the printer 102 is generated and captured, that response may be stored to a set of output capability results 120, for instance a table or other object representing the results of the test exercises and samples. The output capability results 120 may be transmitted to the host 108, for example to present to the user via user interface 116, or may be transmitted to other locations such as a database, Web site or other destination, for instance to log the device's output results. In embodiments, the output capability results 120 may themselves be encapsulated in an electronic document of the same type as electronic test document 118, or may be encoded in other formats or files.

The output capability results 120 may be stored, for example, in print manager 110 to reference the verified output capabilities of a given printer, facsimile machine, copy machine, multipurpose output device or other device or hardware. In embodiments, those results may be used in further output activity for that device, for instance to prevent unsupported fonts, routines or features from being transmitted to printer 102 or other device, without modification. In embodiments the print manager 110 may for example substitute other fonts, routines, functions or other data for those which the printer 102 has been verified to not support, or may in cases build an approximation of those fonts, functions or other features from those which output capability results 120 confirm the printer 102 can support. In other embodiments, a user may be alerted via popup or otherwise that a given document, font, image, effect or other feature is not supported for a pending output job, or may in implementations be queried to cancel the print job, simplify or substitute routines, fonts or features, as desired. In all cases, the direct empirical verification of the output capabilities of the printer 102 or other output device permits the user, applications and operating system to optimize output quality, output speed or other parameters while reducing or eliminating output malfunctions or incompatibilities, such as misprinted characters, overly darkened or lightened images, misaligned or otherwise degraded print or other output.

Figure 3:
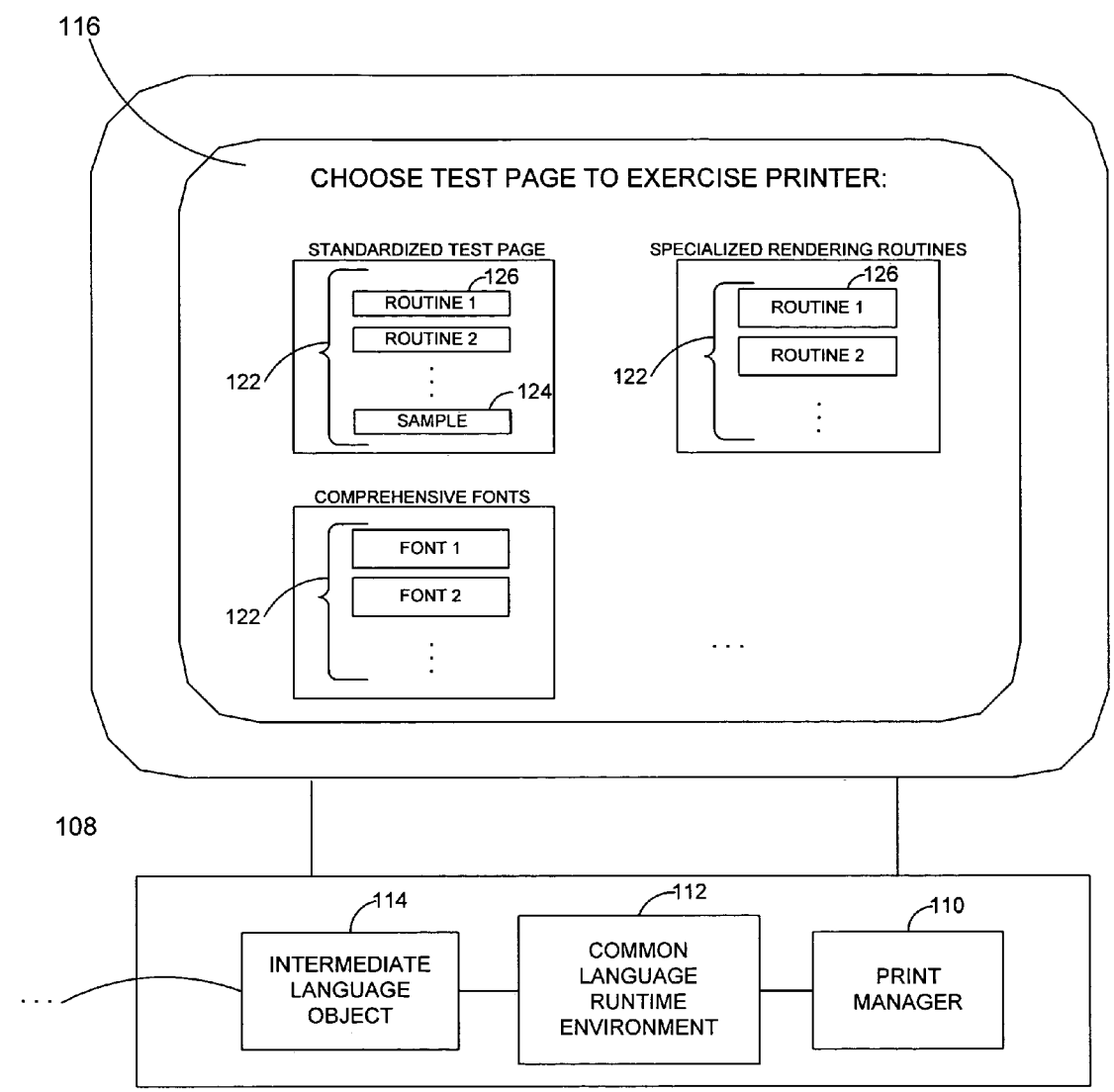
FIG. 3 illustrates a grouping of electronic test pages which may be communicated to a printer or other output device, according to embodiments of the invention.

According to embodiments of the invention in another regard and as illustrated in FIG. 3, the user initiating the testing or exercising of printer 102 or other output device may be presented with a set of test packages to be transformed into electronic test document 118, to select one or more of those packages they desired to use in their application. In embodiments, any one or more of that set of test packages may be stored in or accessed from, for example, an operating system or other resource. In embodiments the set of test packages may include a standardized test page as one electronic test document 118. A standardized test page may be or include a set of routines 126 and one or more sample 124 which may, for instance, be commonly used by word processing, image processing, spreadsheet, browser or other applications, and/or which may be commonly expected within the range of capabilities of printers in different categories. For example, one standardized test page may be applicable among other things to laser printers or facsimile machines, while another may be applicable to dye-sublimation or inkjet printers, or to other output devices or hardware. The set or suite of test packages may also include routines 126 and one or more sample 124 for other purposes, such as, for example and as illustrated, a set of specialized rendering routines designed to exercise advanced printing effects, vector or raster graphics or other output functions. The set of test packages may likewise include one or more package containing a set of fonts, for example as part of or separately from a sample 124, or other data, functions or routines.

In embodiments the set of routines 126 and one or more sample 126 inserted into electronic test document 118 via common language runtime environment 112 and other resources may be entirely selectable by a user, may include selections by default, may manually or automatically downloaded or updated, or be populated or selected in other ways.

Figure 4:
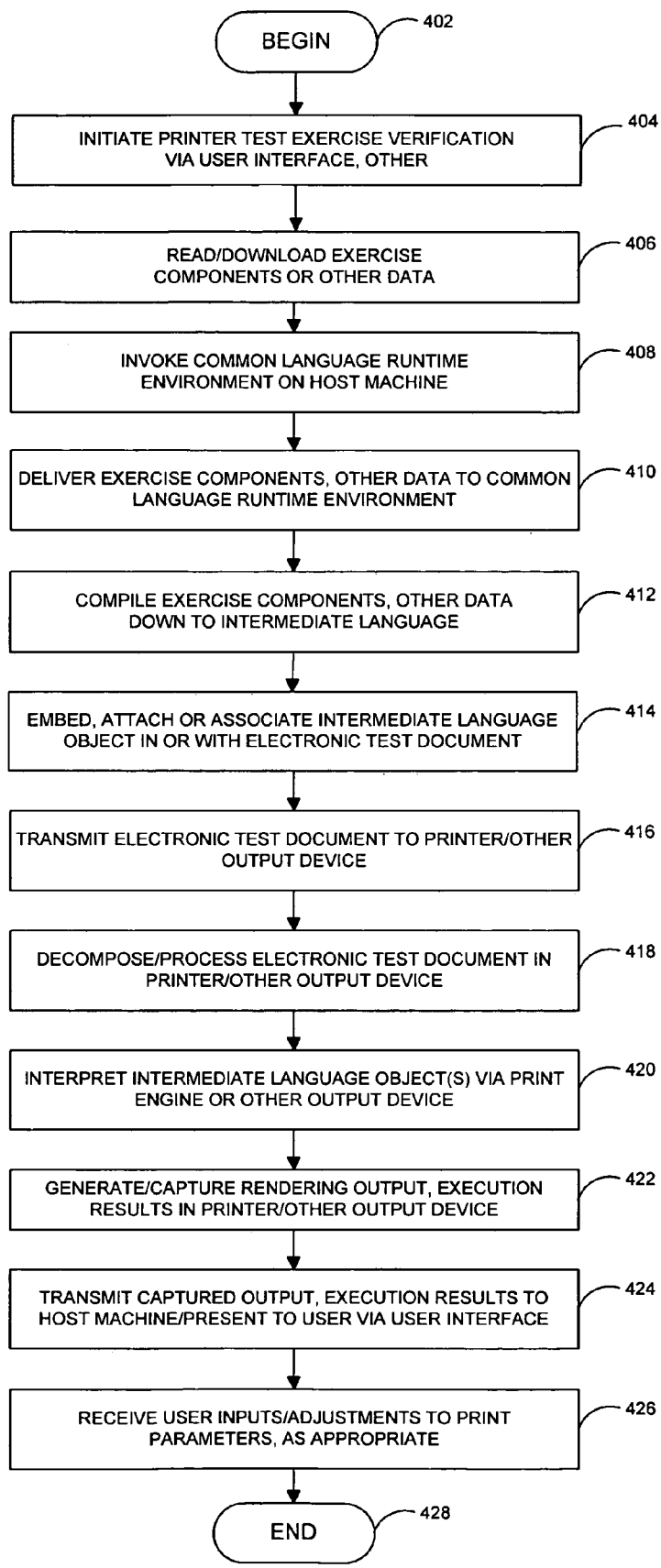
FIG. 4 illustrates overall automatic print or other output verification processing, according to embodiments of the invention.

Overall printer test processing according to an embodiment of the invention is illustrated in FIG. 4. In step 402, processing may begin. In step 404, a test exercise verification may be initiated for a printer, facsimile machine, copy or multifunction machine, or other output device, for instance via user interface 116 on host 108, or otherwise. In step 406, a set of components 122 may be read, accessed or downloaded, for example from a CD-ROM, from within an operating system, from an Internet site, or from other sources. In step 408, common language runtime environment 112 may be invoked in host 108, or in other resources. In step 410, executable or interpretable exercise routines or related components may be delivered from media, storage, download sites or other sources to the common language runtime environment 112. In step 412, the test exercise routines or components may be compiled down to an intermediate language object 114 or multiple objects, for example as interpretable code.

In step 414, the intermediate language object 114 may be embedded, attached or associated in or with an electronic test document 118. In step 416, the electronic test document 118 may be transmitted to the printer 102 or other output device. In step 418, the electronic test document 118 may be decomposed into set of components 122, including for example sample 124 and a set of routines 126. Sample 124 may in embodiments illustratively be or include, for example, a photographic scene with wide dynamic range or contrast, or a pattern of color objects designed to print over specific color ranges. The set of routines 126 may illustratively include a gradient fill function, shadowing patterns, a set of font outputs, half tone patterns, circular or radial lines or raster objects, kerning, tiling or other routines, functions or effects.

In step 420, the intermediate language object 114, illustratively including sample 124 and set of routines 126, associated with the electronic test document 118 may be interpreted for example in interpreter 106 in print engine 106 of printer 102 or other output device. In step 422, the rendering output or execution results of processing the one or more sample 124 and/or the set of routines 126 may be generated and captured in printer 102 or other output device, for instance by reading out a print buffer in printer 102 to capture actual pixel values sent to the print output hardware, or by returning execution codes indicating that, for instance, a half tone or other routine has completed successfully or not. The captured output or results may be recorded in output capability results 120, which may in embodiments be or include another electronic document of the same type as electronic test document 118, be attached or incorporated in electronic test document 118, or be recorded or returned in other data objects or formats.

In step 424, the output capability results 120 or other data object recording output results from printer 102 or other output device may be transmitted to host 108 or other destination, where those results may for example be presented to a user via user interface 116 or otherwise. In step 426, in embodiments inputs or adjustments to print or other output parameters may be received from the user as appropriate, for example to darken a region of half-toning or install or substitute a set of fonts. Other output adjustments are possible. In step 428, processing may repeat, return to a prior processing point, jump to a further processing point or end.

The foregoing description of the invention is illustrative, and modifications in configuration and implementation will occur to persons skilled in the art. For instance, while the invention has generally been described in terms of the printer 102 being tested via a single electronic test document 118, in embodiments multiple electronic test documents may be communicated to the printer 102 or other output device to test that device's capabilities, for example running multiple pages or multipart outputs.

Similarly, while testing operations have in embodiments been described as being initiated via a separate host 108 exercising that machine, in embodiments the testing and profiling of the printer 102 or other output device may be initiated through the printer 102 itself, through commands received over a network, or at other points or through other channels. Other hardware, software or other resources described as singular may in embodiments be distributed, and similarly in embodiments resources described as distributed may be combined. Similarly, while the invention has generally been described in terms of an electronic test document 118 being communicated to a single printer 102, in embodiments the one or more electronic test document 118 may be communicated to multiple printers or other output devices, for instance by way of a network "push" across a local area network (LAN) or otherwise. The scope of the invention is accordingly intended to be limited only by the following claims.

We claim:

1. A system for automatically testing the output capabilities of an output device, comprising:
   an interface to receive a set of output test components;
   a common language runtime environment, communicating with the interface to receive the output test components, the common language runtime environment generating an intermediate language object encapsulating the output test components and associating the intermediate language object with an electronic test document; and
   a communications interface, communicating the electronic test document and associated intermediate language object to an output device configured to execute the intermediate language object, to verify output capabilities of the output device thereby.

2. A system according to claim 1, wherein the output test components comprise at least one of a set of rendering routines, at least one character data sample and at least one image data sample.

3. A system according to claim 1, wherein the common language runtime environment is output device-independent.

4. A system according to claim 1, wherein the association of the intermediate language object to the electronic document comprises embedding within the electronic test document.

5. A system according to claim 1, wherein the output device configured to execute the intermediate language object comprises an intermediate language interpreter to interpret the intermediate language object.

6. A system according to claim 1, wherein the output device comprises at least one of a printer, a facsimile machine, a copy machine, a scanner and a multifunction output device.

7. A system according to claim 1, wherein the output device generates an output capture reflecting results of executing the set of output test components in the electronic test document.

8. A system according to claim 7, wherein the output capture comprises at least one of a frame buffer read and encoded execution results.

9. A system according to claim 7, wherein an update to the firmware of the output device is generated based on the output capture.

10. A method for automatically testing the output capabilities of an output device, comprising:
    receiving a set of output test components;
    generating an intermediate language object encapsulating the output test components in a common language runtime environment;
    associating the intermediate language object with an electronic test document; and
    communicating the electronic test document and associated intermediate language object to an output device configured to execute the intermediate language object, to verify output capabilities of the output device thereby.

11. A method according to claim 10, wherein the output test components comprise at least one of a set of rendering routines, at least one character data sample and at least one image data sample.

12. A method according to claim 10, wherein the common language runtime environment is output device-independent.

13. A method according to claim 10, wherein the association of the intermediate language object to the electronic document comprises embedding within the electronic test document.

14. A method according to claim 10, wherein the output device configured to execute the intermediate language object comprises an intermediate language interpreter to interpret the intermediate language object.

15. A method according to claim 10, wherein the output device comprises at least one of a printer, a facsimile machine, a copy machine, a scanner and a multifunction output device.

16. A method according to claim 10, further comprising generating an output capture reflecting results of executing the set of output test components in the electronic test document.

17. A method according to claim 16, wherein the output capture comprises at least one of a frame buffer read and encoded execution results.

18. A method according to claim 16, further comprising generating an update to the firmware of the output device based on the output capture.

19. An output device, the output device being configured to receive an electronic test document, comprising:

an input interface to receive an electronic test document comprising an intermediate language object; and an intermediate language interpreter, the intermediate language interpreter interpreting the intermediate language object to execute a set of output test components in the output device to verify output capabilities of the output device thereby, wherein the output test components comprise at least one of a set of rendering routines, at least one character data sample and at least one image data sample.

20. An output device, the output device being configured to receive an electronic test document, comprising:

an input interface to receive an electronic test document comprising an intermediate language object; and an intermediate language interpreter, the intermediate language interpreter interpreting the intermediate language object to execute a set of output test components in the output device to verify output capabilities of the output device, wherein the output device generates an output capture reflecting results of executing the set of output test components in the electronic test document.

21. An output device according to claim 19 or 20, wherein the output device comprises at least one of a printer, a facsimile machine and a multifunction output device.

22. An output device according to claim 20, wherein the output capture comprises at least one of a frame buffer read and encoded execution results.

23. An output device according to claim 20, wherein the output device receives a firmware update based on the output capture.

* * * * *

UNITED STATES PATENT AND TRADEMARK OFFICE
CERTIFICATE OF CORRECTION

PATENT NO.         : 7,062,402 B2
APPLICATION NO. : 10/848001
DATED                : June 13, 2006
INVENTOR(S)       : Joseph D. Ternasky et al.

It is certified that error appears in the above-identified patent and that said Letters Patent is hereby corrected as shown below:

The Assignee of this patent is Microsoft Corporation. Please correct this patent to show the following Assignee of this patent:

Title page, #73
Assignee, insert, --Microsoft Corporation, Redmond, WA--

Signed and Sealed this

Second Day of January, 2007

JON W. DUDAS
*Director of the United States Patent and Trademark Office*